(12) United States Patent  (10) Patent No.: US 7,382,607 B2
Skillman  (45) Date of Patent: Jun. 3, 2008

(54) HOUSING FOR A PORTABLE COMPUTING DEVICE

(75) Inventor: Peter Skillman, San Carlos, CA (US)

(73) Assignee: Palm, Inc., Sunnyvale, CA (US)

( * ) Notice: Subject to any disclaimer, the term of this patent is extended or adjusted under 35 U.S.C. 154(b) by 55 days.

(21) Appl. No.: 11/357,917

(22) Filed: Feb. 16, 2006

(65) Prior Publication Data
US 2007/0188987 A1  Aug. 16, 2007

(51) Int. Cl.
G06F 1/16 (2006.01)
(52) U.S. Cl. .................... 361/683; 361/681; 312/223.2
(58) Field of Classification Search ........ 361/679–683; 312/223.1–223.3
See application file for complete search history.

(56) References Cited

U.S. PATENT DOCUMENTS 6,621,691 B2* 9/2003 Howell ........................ 361/683
6,795,306 B2* 9/2004 Jeffries et al. ............... 361/683
7,079,389 B2* 7/2006 Tago ........................... 361/687
7,239,505 B2* 7/2007 Keely et al. ................. 361/681
2006/0232920 A1* 10/2006 Miyamoto et al. .......... 361/683

* cited by examiner

Primary Examiner—Jayprakash N Gandhi
Assistant Examiner—Anthony Q Edwards
(74) Attorney, Agent, or Firm—Fenwick & West LLP

(57) ABSTRACT

A portable computing device has an upper housing segment and a lower housing segment pivotably connected to each other to move between a closed position and an extended or open position. A first inward edge formation is formed along the exterior edge of the upper housing segment. A second inward edge formation is formed along the exterior edge of the lower housing segment. When the portable computing device is in a closed position, the space between the first and second inward edge formations defines a groove formation around the periphery of the portable computing device. The groove formation is dimensioned to receive a user's finger for carrying or opening the portable computing device.

14 Claims, 9 Drawing Sheets

HOUSING FOR A PORTABLE COMPUTING DEVICE

BACKGROUND OF THE INVENTION

1. Field of the Invention

Embodiments described herein relate to a portable computing device. More particularly, the invention relates a housing feature for a portable computing device.

2. Description of Related Art

Portable computing devices, variously known as "note book," "lap top,"and "hand held" computers are distinguished from "tower" computers in size, weight, integrated construction, and portability. The components of a portable computing device, including the keyboard, visual display or monitor, processing logic and digital storage means are typically housed in an integrated unit having first and second housing segments that are hingably coupled along a rear edge. The portable computing device is opened and closed by pivoting the first and second housing segments toward, or away from each other. The screen or display interface of a portable computing device is located on the inner surface of the first (or "upper") housing segment. The keyboard is oriented in a substantially planar orientation along an inner surface of the second housing segment.

DETAILED DESCRIPTION OF THE INVENTION

Figure 1:
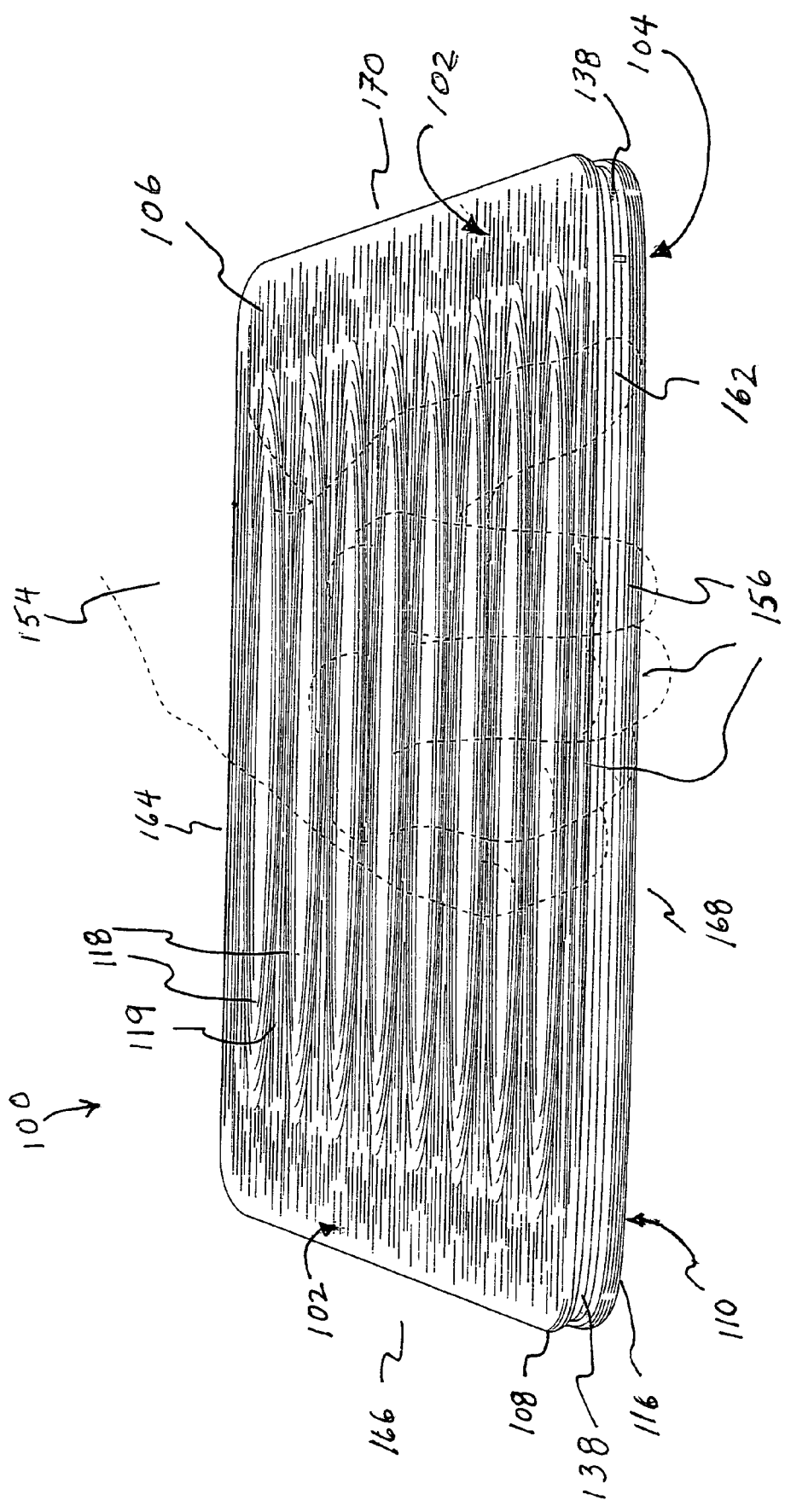
FIG. 1 depicts a frontal isometric view of a portable computing shown by an embodiment of the invention in FIG. 1, with a user's hand (shown in phantom) engaging the groove formation along the front edge segment.

The embodiments disclosed herein include a computer that has two housing segments. The two housing segments can rotate between open and closed positions. In the closed position, the peripheral section of the two segments combine to form a groove feature. The groove feature provides a visual and physical aid to enable the user to move the two housing segments into an open position. Under an embodiment, the appearance provided is that of a hard bound book. In this way, a housing feature as described by one or more embodiments herein provides a user a portable computing device with the appearance and/or feel of a hardbound book.

A portable computing device has an upper housing segment and a lower housing segment pivotably connected to each other to move between a closed position and an extended or open position. A first inward edge formation is formed along the exterior edge of the upper housing segment. A second inward edge formation is formed along the exterior edge of the lower housing segment. When the portable computing device is in a closed position, the space between the first and second inward edge formations defines a groove formation around at least part of the periphery of the portable computing device. The groove formation is dimensioned to receive a user's finger while carrying the portable computing device, or to enhance the ease of opening the portable computing device.

According to one or more embodiments, each inward edge formation is acutely oriented with the vertical axis. Each inward edge formation may be linear, substantially linear or formed from one or more linear segments. Alternatively, each inward formations may be contoured into a vertically aligned or extending segment. In this way, the inward formations have both a vertical length and a horizontal, inwardly directed length. In one embodiment, the vertical length is larger than the horizontal length.

In an embodiment, the portable computing device includes features for enabling the portable computing device to be more user friendly. The portable computing device may include first and second housing segments for housing various components of the portable computing device, including, for example, the visual display (also called the "display" or the "monitor") and the keyboard.

An embodiment is directed towards a portable computing device, comprising a first ("upper") housing segment, and second ("lower") housing segment pivotably coupled to swivel around a hinge member between an extended or "open" position, and a closed position. In a closed position, the first and second housing segments combine to form a groove formation dimensioned to receive an end portion of at least one finger of a user. The groove formation may be a substantially "V-shaped" cavity formed along the edge of a portable computing device. In an embodiment, the groove formation is formed when the computer is in a closed position, and a first inward edge formation on the first housing segment is oriented opposite from a second inward edge formation on the second housing segment. In practice, a user inserts at least a portion of at least one finger tip or thumb tip into the groove to open the portable computing device. The user then releases any clasp mechanism holding the first and second housing members together, and presses a portion of his fingertip against either the first inward edge formation or the second inward edge formation. The user's force against a selected inward edge formation will translate into a rotational moment upon one of the housing segments, causing the first and second housing segments to separate, thereby opening the computer. The angle of the select inward edge relative to its housing segment allows the user to maintain a force upon the inward edge throughout the opening process. According to an embodiment, the angle of the select edge relative to its respective housing member allows the user to impart an opening force while reducing any horizontal force application that could cause the computer to slide across a supporting surface (such as a table-top).

FIG. 1 depicts a top isometric view of a portable computing device 100. From the perspective of FIG. 1, the boundaries of the portable computing device are defined by a first (rear) edge segment 164, a second (left side) edge segment 166, a third (front) edge segment 168 and a fourth (right side) edge segment 170, and a first (upper) exterior surface 106. A first (upper) housing segment 102 and a second (lower) housing segment 110 are configured to pivot relative to each other by a hinge member (not shown) disposed proximate the rear edge segment 164. A first exterior edge 108 is formed around the second, third and fourth segments of the first (upper) housing segment 102, and a second exterior edge 116 is formed around the second, third and fourth edge segments of the second (lower) housing segment 110. In a closed position, the first exterior edge 108 and the second exterior edge 116 forming the groove formation 138 visible along the third (front) edge segment 168. The groove formation extends contiguously along the second, third and fourth edge segments 166, 168, 170, specific portions of which are more easily seen in subsequent Figures.

A user's hand 154 is shown in phantom. The finger tips (not visible) of the user's fingers 156, and the tip of the user's thumb 162 are inserted into the groove formation 138 in preparation of opening the portable computing device.

The first exterior surface comprises a surface texture which, according to the embodiment of FIG. 1, includes undulations 118. The surface texture of the first exterior surface is textured to evoke at least one of a variety of tactile and sensory perceptions. For example, the surface texture may orient a user's hand through a tactile "grain" or direction of the surface texture, providing a more sure grip for a user's hand, and evoking the tactile "feel" of the surface of a book covered in expensive textured leather. The undulations run parallel to the third (front) edge segment 168, thereby providing structure by which the heel of a user's hand can generate a frictional force when engaging the first exterior surface 106 in the manner shown in FIG. 1. The surface undulations 118 of FIG. 1 disclose a "step" profile, further adding to the texture and grain of the first exterior surface 106. Alternative formations, however are envisioned for producing such raised undulations. In the example provided by FIG. 1, the undulations are in the form of swells, or outwardly directed contours aligned along a particular grain. The undulations 118 thus extend from an underlying level plane 119, adding thickness to the upper housing segment. To this end, each undulation includes a peak point, and radio of curvature from the underlying surface 119 to that peak. Other shapes are contemplated as well. While an embodiment shown with FIG. 1 contemplates eight undulations 118, one or more may be employed in different designs.

Figure 2A:
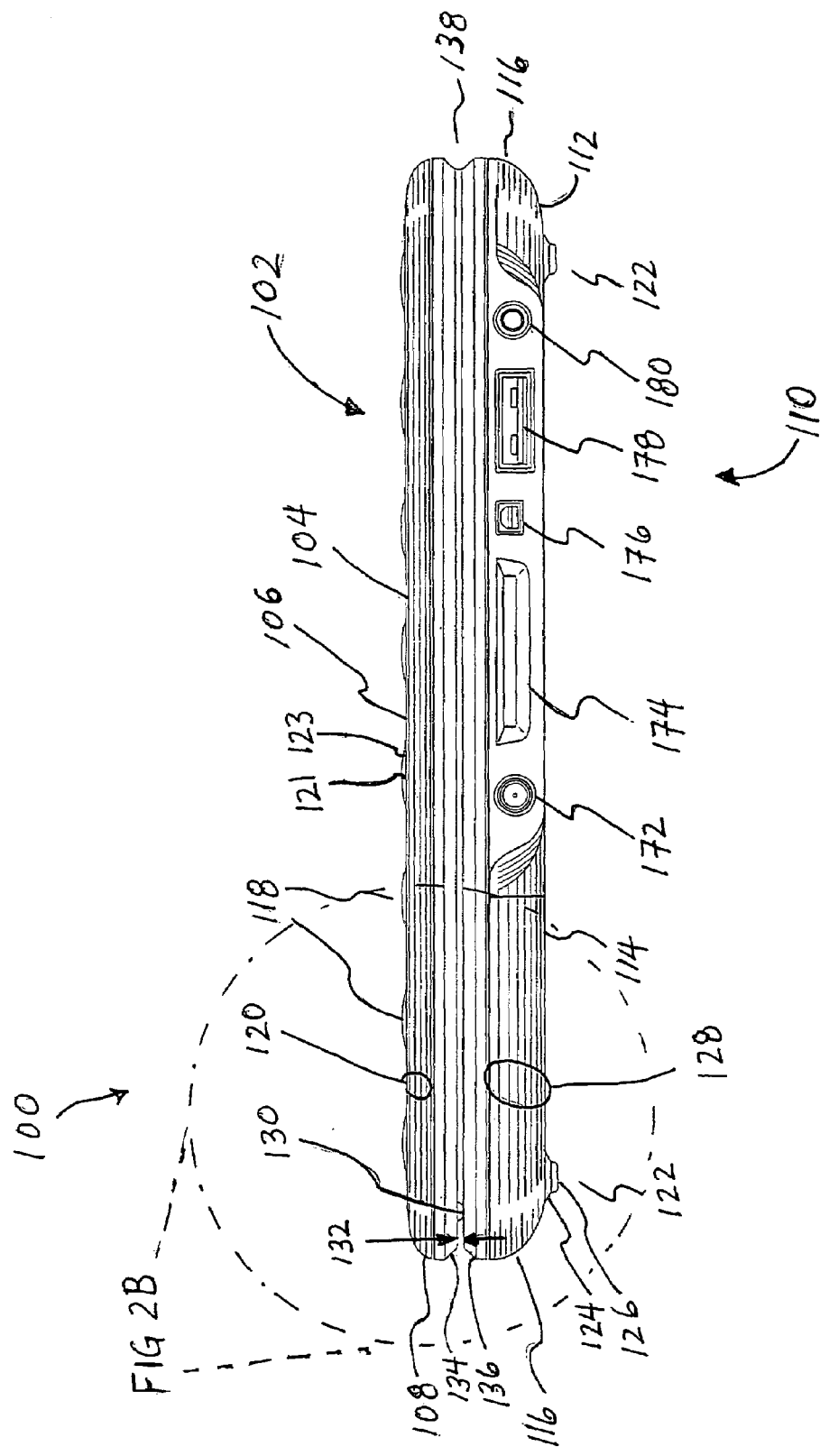
FIG. 2A depicts a left side elevational view of a portable computing device, under an embodiment of the invention.

FIG. 2A depicts a right side elevational view of a portable computing device 100 according to an embodiment, looking at the fourth edge segment 170 of FIG. 1. A first housing segment 102 (which, according to the most common orientation of a portable computing device is the upper housing segment) includes a first outer shell 104 extending from a first exterior surface 106 (shown as the top portion of the first housing segment from the perspective of FIG. 2A), and extending downward to a first exterior edge 108 of the first housing segment 102.

The first exterior edge 108 includes upper ridges 120 that extend horizontally (from the perspective of FIG. 2A). The upper ridges along the first exterior edge enable orientation of a user's hand as to a location on the computing device, providing a more sure grip for a user's hand, and evoking the tactile "feel" of pages of a book.

The first outer shell 104 includes the first exterior surface 106, and the first exterior edge 108, specific features of which are more clearly visible in the enlarged portion of FIG. 2B discussed below.

A second housing segment 110 (which, according to the most common orientation of a portable computing device is the lower housing segment) includes a second outer shell 112 extending from a second exterior surface 114 (shown as the bottom surface of the second housing segment from the perspective of FIG. 2A), and extending upward to a second exterior edge 116 of the second housing segment 110. Feet 122 extend from the second exterior surface, and are used for placing the computing device 100 on a flat surface. According to an embodiment, the feet include a housing foot extension 124 integrally formed from the second outer shell 112, and a foot cushion insert 126 formed from an elastomer such as rubber that is attached to, or partially inserted into the housing foot extension. The foot cushion insert creates friction between the portable computing device and a surface, thereby reducing skidding, or other contact breaks with a desk top or other surface. Additionally, the elastomer attenuates sound and vibrations imparted between the portable computing device and a table top, and, by deforming, can accommodate slight deviations in a table top or other support surface.

The second exterior edge 116 includes lower ridges 128 that extend horizontally (from the perspective of FIG. 2A). The lower ridges along the second exterior edge further orient a user's hand as to a location on the computing device, providing a more sure grip for a user's hand, and evoking the tactile "feel" of pages of a book.

The second outer shell 112 includes the second exterior surface 114, and the second exterior edge 116, specific features of which are more clearly visible in the enlarged portion of FIG. 2B discussed below A stop 130 is disposed between the first housing segment 102 and the second housing segment 110. The stop can be semi-permanently or permanently attached to either the first housing segment 102 or the second housing segment 110. The stop is preferably made from an elastomer such as rubber, and functions to cushion any impact between the first and second housing segments when being closed, to deaden any noise that might otherwise be generated during closure if hard plastic portions were to impact. The stop also functions to maintain a gap 132 between the first and second housing sections when they are in the closed position relative to each other.

According to one embodiment such as shown, a first inward edge formation 134 may be formed a beveled angle along the first exterior edge 108, and a second inward edge formation 136 is formed at a beveled angle along the second exterior edge 116. When the first and second housing segments 102, 110 are in the closed position, as depicted in FIG. 2A, the combination of the first and second inward edge formations comprise at least part of a groove formation 138. In embodiments that include a gap 132, as shown in FIG. 2A, the size of the groove formation is extended by the size of the gap, which further comprises part of the groove formation in FIG. 1.

Figure 2B:
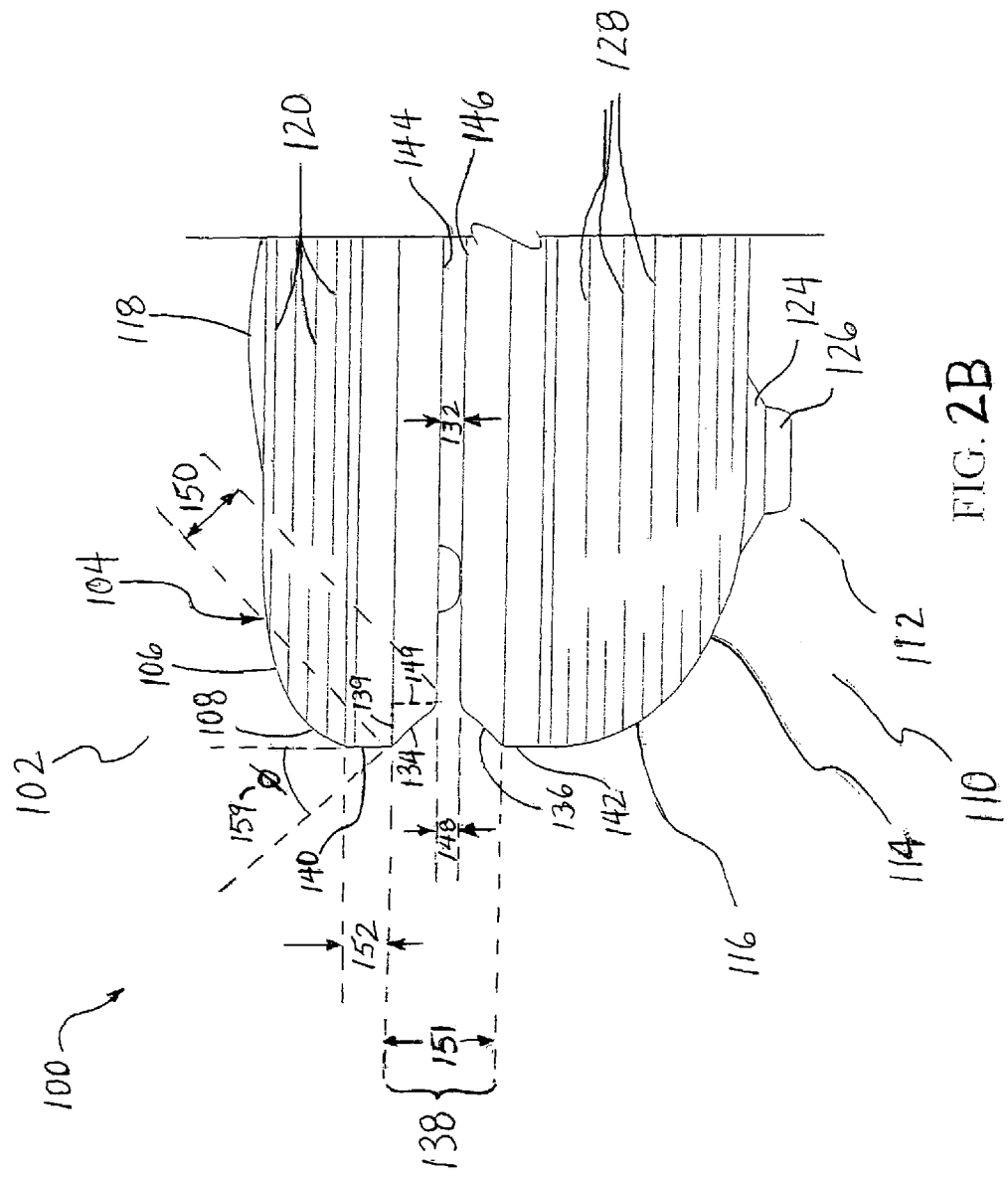
FIG. 2B depicts an enlarged view of a portable computing device as shown by an embodiment of the invention in FIG. 2A.

FIG. 2B further illustrates that each of first inward edge formation 134 and second inward edge formation 136 includes a horizontal component 139 and vertical component 149. The horizontal component 139 is defined as the horizontal length (assuming orientation of the figure) for a length in which the vertical length 149 is present. In one implementation, the horizontal and vertical lengths 139, 149 are each substantial components, meaning that the components are of the same range, and further that an angle formed by the two components is between 15-75 degrees, and even in the range of 45 degrees with some embodiments. The horizontal lengths 139 may be larger than, equal to, or less than the vertical length 149 to form an angle 159 with a vertical axis. While the inward formation is shown to be substantially linear, other implementations may provide for the inward formation to be contoured. Even with contoured aspects, the vertical component 149 and the horizontal component 139 may still exist for the inward formation.

Within FIG. 2A, various ports are disposed along the second exterior edge 116 on the fourth edge segment 170, including a D.C. power port 172, a PCMCIA port 174, an Ethernet port, a Universal Serial Bus (USB) port 178, and an infra red port 180. These ports are examples of suitable connectivity. A portable computing device such as described may operate in concert with any communication or expansion port currently in use, or adopted for future use. Although the expansion and communication ports of FIG. 2A are illustrated as being integral to the second housing segment 110, embodiments are envisioned wherein various communication ports are included in the first housing segment as well. Additionally, communication and expansion ports can be formed along any or all of the first, second and third edge segments 164, 166, 168, and are not limited to a single edge segment or side. Additionally, ports can be installed on any other surfaces, as illustrated by the audio video outlet 194 of FIG. 4.

With further reference to FIG. 2A. the undulations 118 are shown to include a peak 121 and a outwardly contoured surface 123 extending to that peak 121. The overall effect on the housing is the formation of a grain.

FIG. 2B is an enlarged view of a cut-away portion of the computing device 100 circled in FIG. 2A. As discussed above, the first outer shell 104 includes the first exterior surface 106, and the first exterior edge 108. Upper ridges 120 are formed horizontally along the first exterior edge. Moving downward along the first exterior edge 108, the upper ridges terminate at the first lip 140, which forms a smooth surface of the first exterior edge 108. The first lip is formed at an angle about perpendicular to the first inner face 144, and extends from the upper ridges 120 to the first inward edge formation 134, having a first lip height 152 that is preferably in the range of 1 mm to 8 mm, and more preferably in the range of 2 mm to 4 mm.

The first inward edge formation 134 is the lowest portion of the first exterior edge, and forms a beveled surface folded inward from the first lip 140 at an angle of between 30 degrees and 70 degrees relative to the first lip, and more preferably between 40 and 50 degrees. The first inward edge formation extends from end of the first lip to the first inner face 144, and has a width 150 of between 2 mm and 15 mm, and more preferably between 3.5 mm and 9 mm. According to the embodiment of FIG. 2B, the first inward edge formation has a slightly concave shape to it dimensioned to receive the fatty portion of a user's finger(s) immediately adjacent the fingertip(s). According to one embodiment, the concavity comprises a curvature of a circle having a diameter of between 6 cm and 20 cm, and more preferably about 12 cm. However, unless limited by specific dimensions, the appended claims envision concave embodiments of any curvature. An embodiment also envisions alternative embodiments having a first inward edge formation formed along a substantially straight line, and also exhibiting a slightly convex curvature.

The first outer shell 104, which includes the first exterior surface 106, the upper ridges 120, the first lip 140 and the first inward edge formation 134, can be fabricated as a continuous unitary piece through any known fabrication and molding technique. Alternatively, embodiments are envisioned wherein some or all of the elements of the first outer shell can be formed from separate members that are integrally secured into the first housing segment 102.

The second outer shell 112 includes the second exterior surface 114, and the second exterior edge 116. Lower ridges 128 are formed horizontally along the second exterior edge. Moving upward along the second exterior edge 116, the lower ridges terminate at the second lip 142, which forms a smooth surface of the second exterior edge 116. The second lip is formed at an angle about perpendicular to the second inner face 146, extending from the lower ridges 128 to the second inward edge formation 136. According to one embodiment, the height of the second lip is about equal to the first lip height 152.

The second inward edge formation 136 extends from end of the second lip to the second inner face 144, and forms a beveled surface folded inward from the second lip 142 at an angle of between 30 degrees and 70 degrees relative to the second lip, and more preferably between 40 and 50 degrees. According to an embodiment, the second inward edge formation exhibits a curvature about equal to the curvature exhibited by the first inward edge formation 134. According to an alternative embodiment, the first inward edge formation 134 has a slightly concave formation as described above, and the second inward edge formation 136 has a slightly convex curvature, thereby allowing a user to distinguish an orientation of the processing unit 100 by tactile feel of the groove formation 138.

The second outer shell 112, which includes the second exterior surface 114, the lower ridges 128, the second lip 142 and the second inward edge formation 136, can be fabricated as a continuous unitary piece through any known fabrication technique, such as molded thermo-plastic, that includes, in unitary construction, However, embodiments are envisioned wherein some or all of the elements of the second outer shell can be formed from separate members that are integrally secured into the second housing segment 110.

In FIG. 2B, the gap 132 is more clearly distinguishable as the space between the first inner face 144 of the first housing segment 102 and the second inner face 146 of the second housing segment 110, and possess a gap height 148 that is preferably in the range of 1 mm to 3 mm, though gap heights of less than 1 mm or greater than 3 mm are comprehended within the scope of the appended claims unless specifically limited therein.

When the first and second housing segments 102, 110 are in the closed position, the combination of the first and second inward edge formations 134, 136, and the gap 132, form a V-shaped groove formation 138 having a height 151 in the range of 5 mm to 15 mm, and more preferably between 6 mm and 8 mm.

Figure 3:
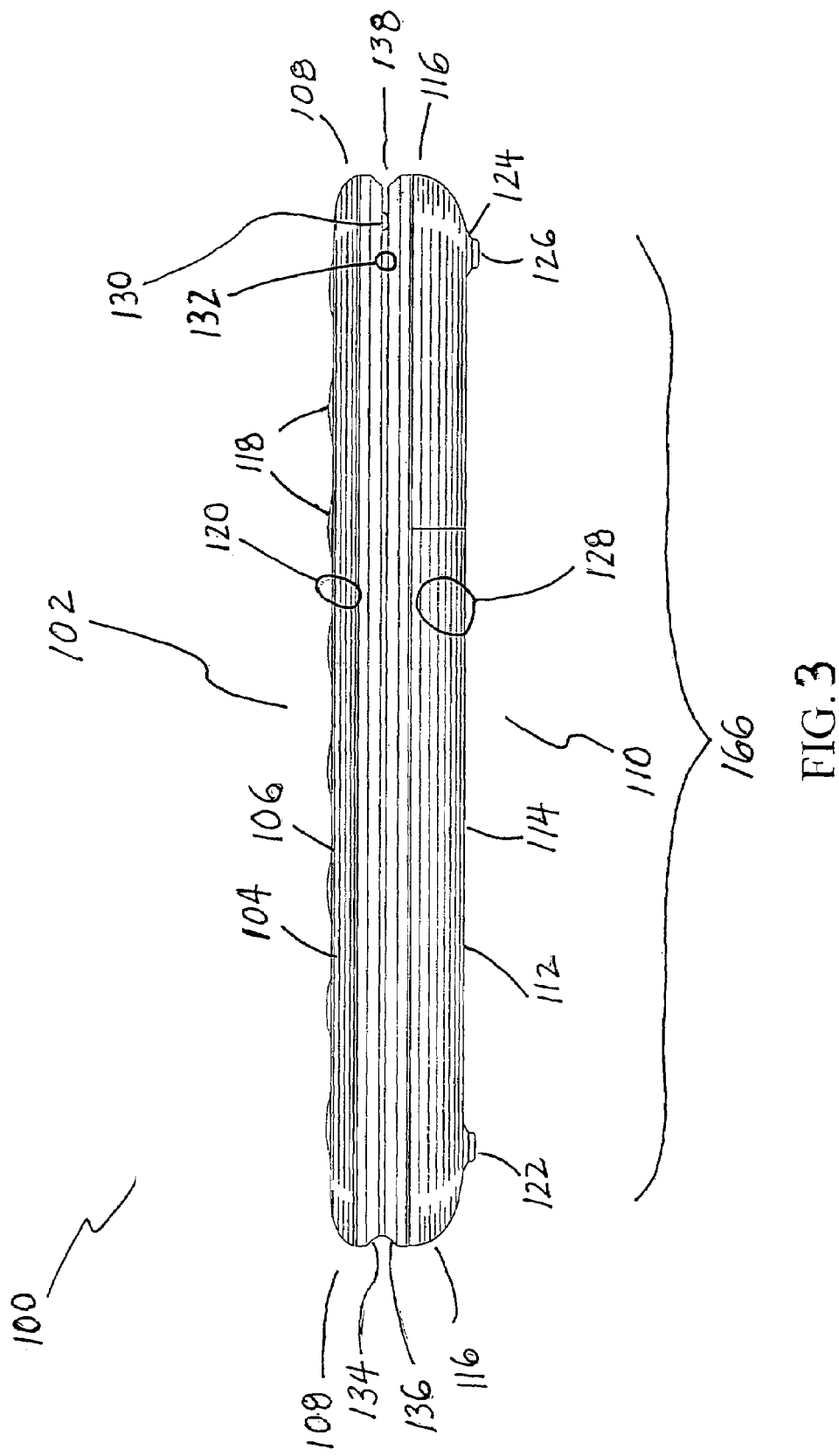
FIG. 3 depicts a right side elevational view of a portable computing device shown by an embodiment of the invention in FIG. 2A.

FIG. 3 discloses a left side elevational view of the portable computing device of FIG. 1, and is taken looking toward the second edge segment 166. The groove formation 138 formed in part by the combination of the beveled surface of the first inward edge formation 134 and the beveled surface of the second inward edge formation 136 is observed to extend along this second edge segment 166. From the FIG. 1-3, it can therefore be appreciated that the groove formation 138 extends contiguously along the second, third and fourth edge segments 166, 168 170.

Figure 4:
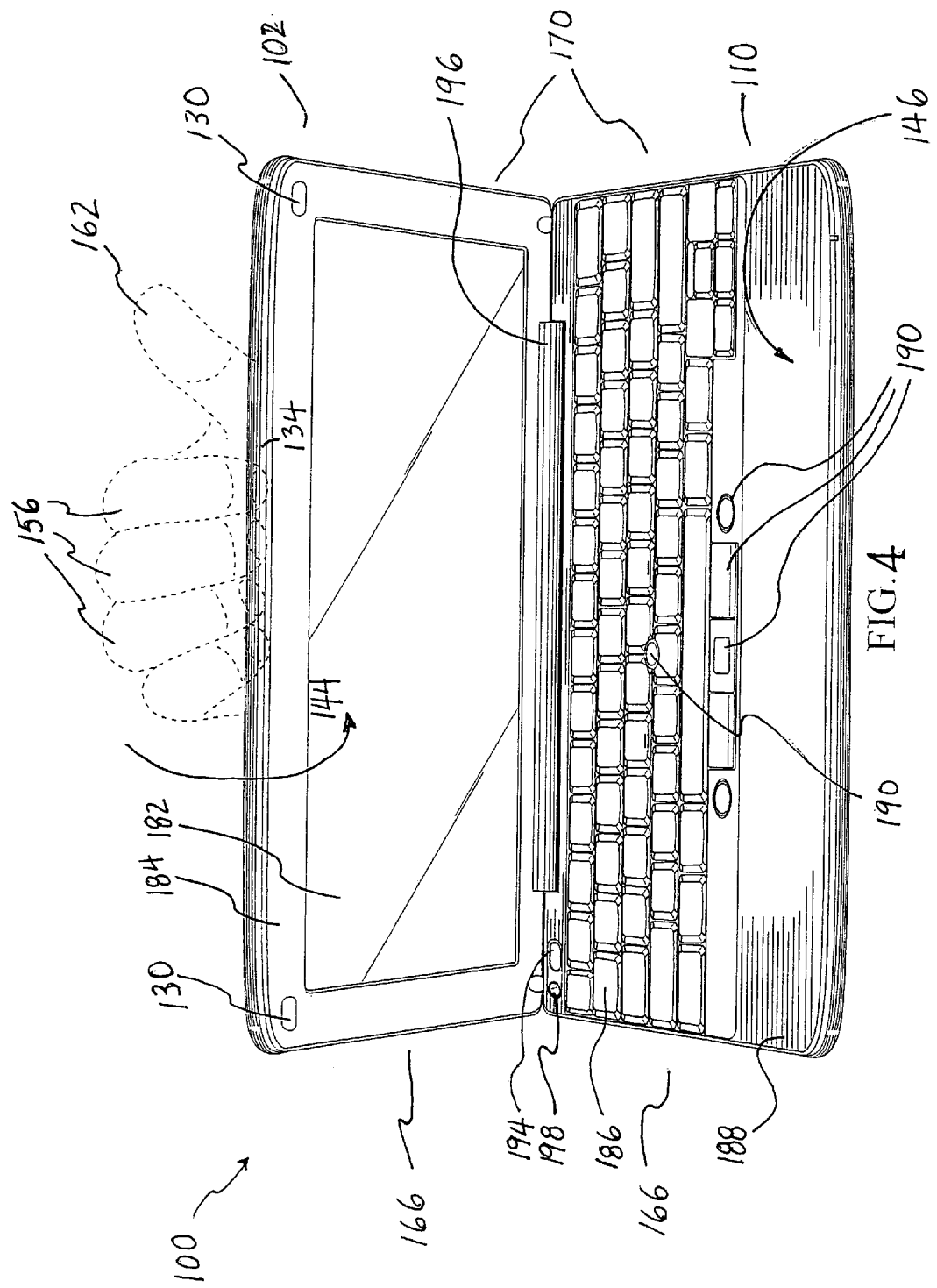
FIG. 4 depicts the frontal isometric view of a portable computing device shown by an embodiment of the invention in FIG. 2.
Figure 5:
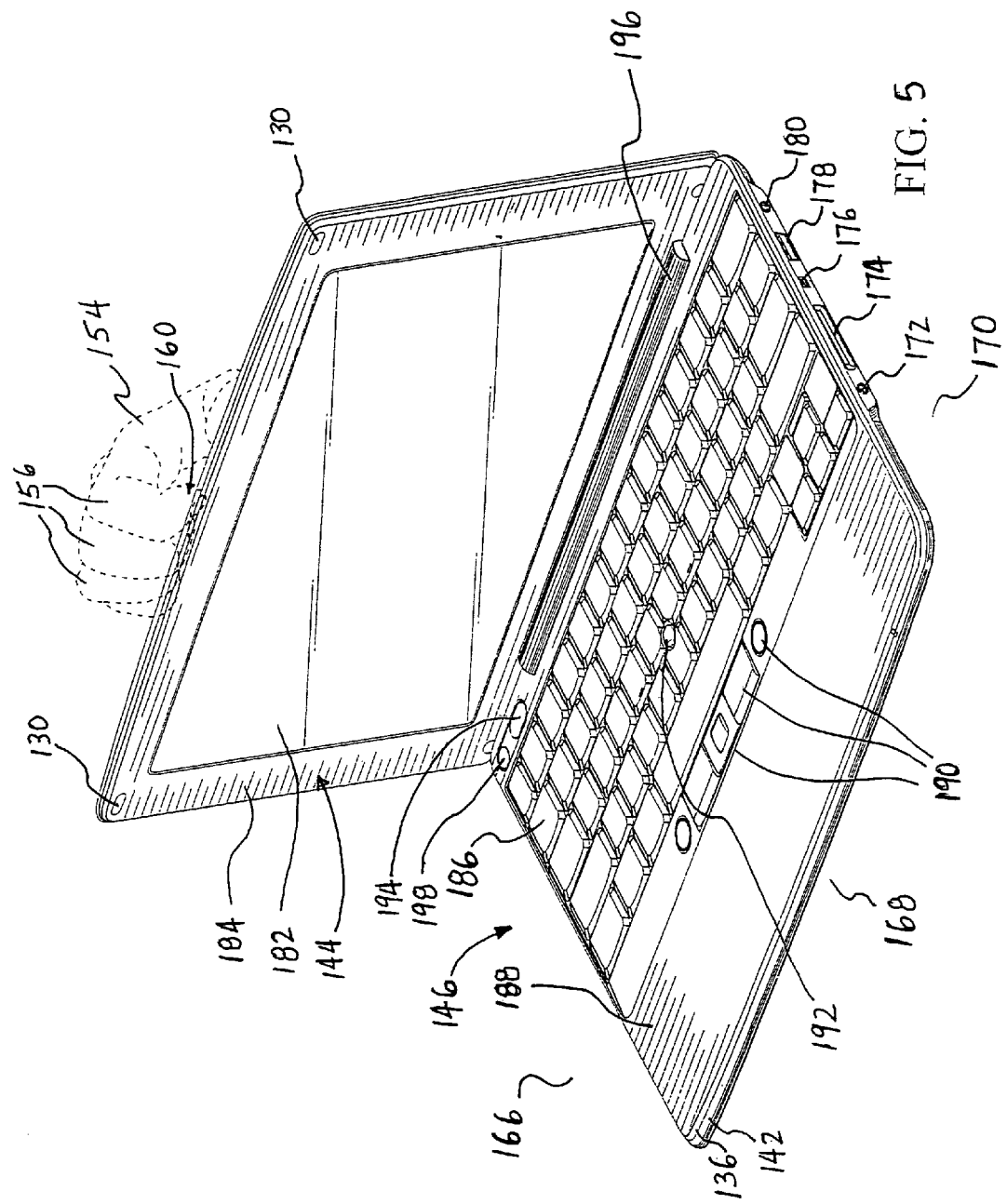
FIG. 5 depicts a side isometric view a portable computing device shown by an embodiment of the invention in FIG. 4 with a user's hand shown in phantom.

FIGS. 4 and 5 depicts the portable computing device 100 of FIG. 2, but with the first housing segment 102 rotated away from the second housing segment 110 to present in a partly open position. The fingers 156 of the user depicted in phantom are wrapped under the first inward edge formation 134 to apply upward rotational force on the first housing segment. Because the first inward edge formation extends contiguously along the entire lengths of the second, third, and fourth edge segments 166, 168, 170, the user may engage their fingers 156 anywhere along the first inward edge formation to open the portable computing device. This further extends the impression of feel that the computing device is a "book".

The first inner face 144 includes a display frame 184 surrounding a display screen 182. The stops 130 are embedded in the display frame. The display screen depicted in FIG. 4 has a horizontal width greater than the vertical height of the display screen. Alternative embodiments are envisioned, however, wherein the display screen has four sides of equal length, or even has a greater vertical height than its horizontal width. Alternatively shaped display screens not having four sides can also be used in conjunction with an embodiment described herein. A hinge member 196 couples the first and second housing segments 102, 110 along the first (rear) edge segment 164.

Within the second housing segment 110, various members are disposed on the second inner face 146, including a keyboard 186, a j-mouse 192, a wrist support 188, and other manual interface members 190, which can include mechanisms such as a scroll device, a touch pad, "right" click and "left click" switch inputs, and other means for tracking a cursor across the screen by manual input, or otherwise executing a function or interfacing with an on-screen image. An on-off switch 198 and Audio and visual I/0 ports 194, are also disposed on the second inner face 146. As noted above, the specific location for various ports on or within the portable computing device 100 is exemplary, and is typically determined by user preferences.

Figure 6:
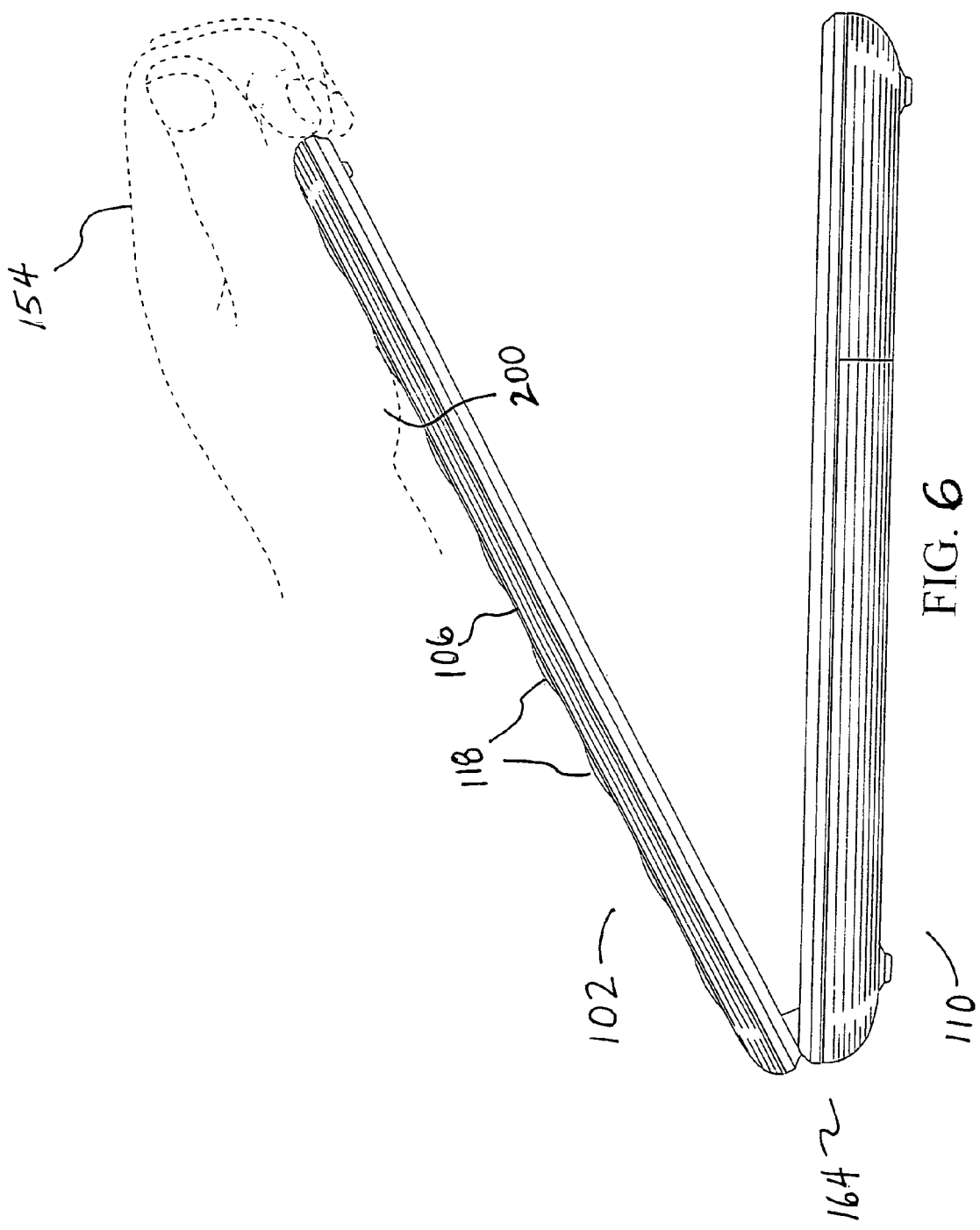
FIG. 6 depicts a left side elevational view of a portable computing device shown by an embodiment of the invention in FIG. 4, with a user's hand shown in phantom.

FIG. 6 is a left side elevation view of the portable computing device 100. A user's hand shown in phantom is raising the first housing segment 102 relative to the second housing segment 110. In the closed position, the first housing segment 102 therefore functions as a cover. The user's fingers are oriented against, or proximate to the first inward edge formation to exert the force necessary to effect the raising. The heel 200 of the user's hand is engaged with the undulations 118 and textured first exterior surface 106, thereby allowing the user's hand to grip the cover through a frictional engagement. By pressing down with the heel of the hand while lifting up with the fingers against the first inward edge formation 134, a slight rotational torque can be applied to the cover to prevent the first edge segment 164 along the rear of the portable computing device from raising up off a table or surface. By incorporating a textured first exterior surface 106 as depicted herein, the process of opening the portable computing device from a closed position to an open position is thereby made easier and more reliable for users.

Figure 7:
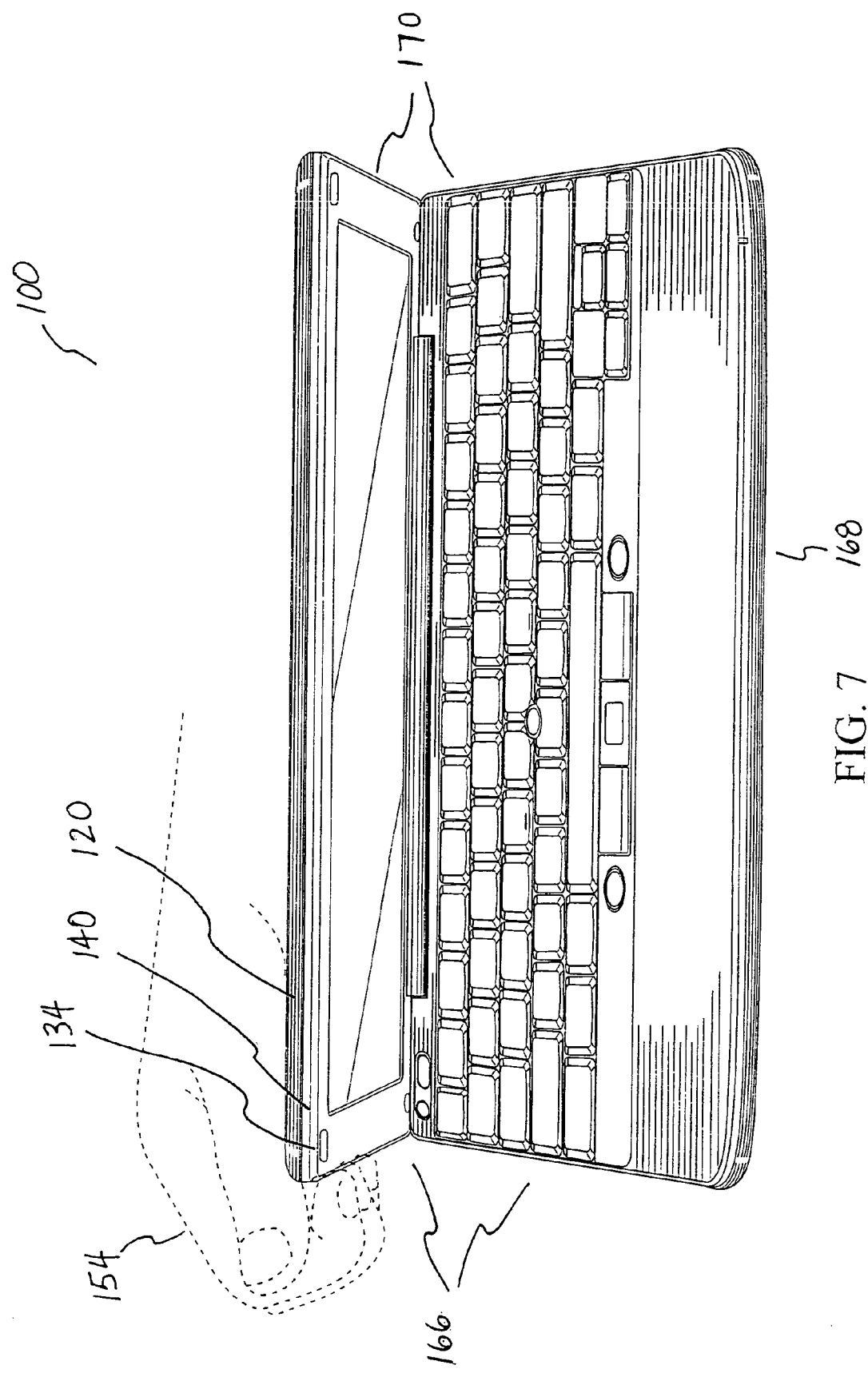
FIG. 7 depicts a front isometric view of a portable computing device shown by an embodiment of the invention in FIG. 2 being opened by a user's hand (shown in phantom).

FIG. 7 shows a user's hand 154 (in phantom) opening the portable computing device 100 of FIG. 1 from along the second edge segment 166. Because the groove formation 138 extends along the second, third and fourth edge segments 166, 168, 170 when the device is in a closed position, a user seeking to open the device can insert their finger(s) into the groove formation 138 anywhere along the second, third or fourth edge segment. Additionally, because the beveled first inward edge formation 134 extends around the second, third and fourth edge segments, as the device opens, the user can keep their fingers at the same location that they originally used when they inserted their fingers into the groove formation 138.

Figure 8:
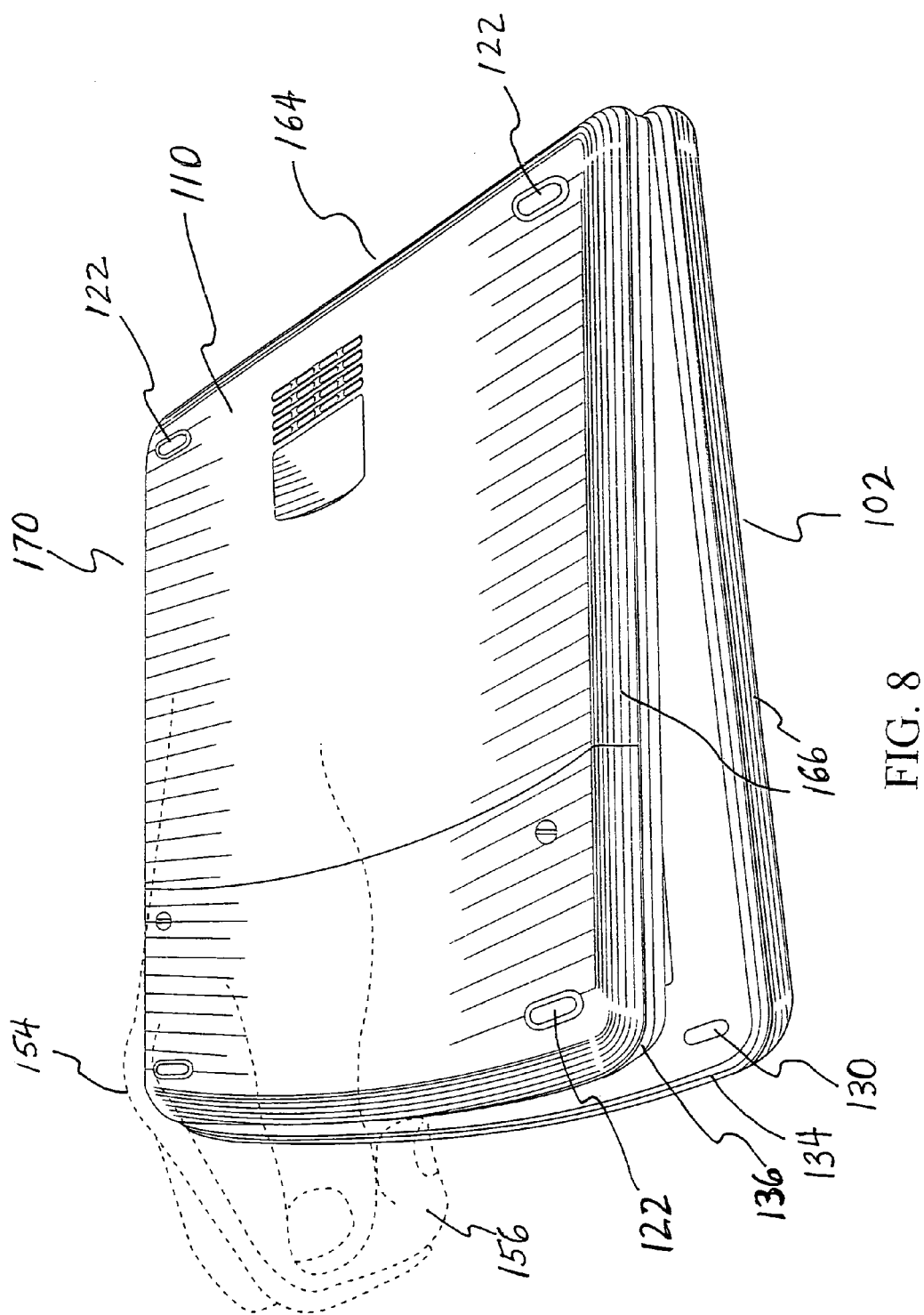
FIG. 8 depicts a bottom/side isometric view of a portable computing device as shown by an embodiment of the invention in FIG. 2 in an "upside down"orientation.

FIG. 8 depicts the portable computing device of FIG. 1 in an "upside down" orientation, wherein the second housing segment 110 is on top, and the first housing segment 102 is on bottom. An embodiment envisions a symmetrical groove formation 138 in which the size and contour of the first and second inward edge formations 134, 136 are similar or identical. According to this embodiment, a user can insert their fingers 156 into the groove when the portable computing device is in an upside down position, and engage the second inward edge formation 136 with the same ease that they could engage the first inward edge formation when the portable computing device is "right-side-up." The symmetry of the groove formation can thereby enhance the utility and functionality of an embodiment provided herein.

The foregoing description of the invention has been presented for purposes of illustration and description. It is not intended to be exhaustive or to limit the invention to the precise forms disclosed. Many modifications and variations will be apparent. It is intended that the scope of the invention be defined by the following claims and their equivalents.

What is claimed is:

1. A portable computing device comprising:
a first housing segment and a second housing segment pivotably connected to the first housing segment to move between a closed position and an extended position, wherein the first housing segment includes a first exterior edge having a first inward edge formation, wherein the first housing segment has a first inner face on which a video display is provided; and wherein the second housing segment has a second exterior edge having a second inward edge formation, wherein the second housing segment has a second inner face on which a keyboard is provided, wherein, in a closed position, the first and second housing segments provide a groove formation formed, in part, by the first inward edge formation and the second inward edge formation, wherein said formation is dimensioned to receive a user's finger, and wherein the first inward edge formation comprises an at least partially concave shape dimensioned to engage a portion of a user's finger proximate the fingertip; and wherein the at least partially concave shape comprises a curvature of a circle;
wherein the first housing segment and the second housing segment are pivotably connected proximate a first edge segment;
wherein the first housing segment includes an exterior surface having a plurality of raised undulations parallel to the first edge segmnent; and
wherein each inward formation includes a horizontal component and a vertical component that form an angle with the vertical, and a stop connected to one of the first or second inner faces such that, in the closed position, the stop engages the other inner face, thereby forming a gap between the first inner face and the second inner face in the closed position.

2. The portable computing device of claim 1, wherein in the closed position, the groove formation extends continuously across a second edge segment, a third edge segment, and a fourth edge segment.

3. The portable computing device of claim 2 wherein the first and third edge segments are about parallel, and the second and fourth edge segments are about parallel.

4. The computing device of claim 1, wherein the first inward edge formation is oriented at an angle of about forty-five degrees relative to the first inner face.

5. The computing device of claim 1, wherein the first exterior edge further includes a first lip that engages the first inward edge formation at about a forty five degree angle, the first lip being about perpendicular to the first inner face.

6. The computing device of claim 1, wherein the second housing segment further includes a second lip that engages the second inward edge formation at about a forty five degree angle, the second lip being about perpendicular to the second inner face.

7. The computing device of claim 5, wherein the first inward edge and the first lip have a smooth texture.

8. The computing device of claim 5, wherein the length of the first inward edge from the first inner face to the first lip is between 4 mm and 9 mm.

9. The computing device of claim 5 wherein the first inward edge forms a beveled surface extending between the first lip and the first inner face.

10. The computing device according to claim 8, wherein the length of the second inward edge formation as measured from the second inner face to the second lip is identical to the length of the first inward edge formation as measured from the first inner face to the first lip.

11. A portable computing device comprising:
a housing having first and second housing members pivotably connected along a first edge segment to pivot between a closed position and an open position, wherein the first housing member includes a first exterior edge having a first inward edge formation and the second housing member has a second exterior edge having a second inward edge formation, wherein, in a closed position, the first and second inward edge formations provide a groove formation formed, in part, by the first housing member and the second housing member, wherein said formation is dimensioned to receive a portion of a user's finger, the first housing member having a first inner face on which a video display is provided surrounded by a display frame, the second housing member having a second inner face on which a keyboard is provided,
wherein the first inward edge comprises an at least partially concave shape dimensioned to engage a portion of a users finger proximate the fingertip, the at least partially concave shape comprising a curvature of a circle; and
a stop connected to the second inner faces such that, in the closed position, the stop engages the display frame, thereby forming a gap between the first inner face and the second inner face in the closed position.

12. The computing device of claim 11, wherein, in the closed position, the groove formation extends continuously across a second edge segment, a third edge segment, and a fourth edge segment.

13. The computing device of claim 11, wherein a first inner face is formed, at least in part, by the first housing member, and a second inner face is formed, at least in part, by the second housing member, such that in the closed position the first inner face faces the second inner face.

14. The computing device of claim 13, wherein the first inward edge is oriented at an angle of about forty-five degrees relative to the first inner face.

* * * * *

UNITED STATES PATENT AND TRADEMARK OFFICE
CERTIFICATE OF CORRECTION

PATENT NO. : 7,382,607 B2  
APPLICATION NO. : 11/357917  
DATED : June 3, 2008  
INVENTOR(S) : Peter Skillman Page 1 of 1

It is certified that error appears in the above-identified patent and that said Letters Patent is hereby corrected as shown below:

Column 10,  
Line 27, please insert -- , --, after "such that"  
Line 28, please insert -- , --, after "position"

Signed and Sealed this

Nineteenth Day of August, 2008

JON W. DUDAS  
*Director of the United States Patent and Trademark Office*